Figure 1:
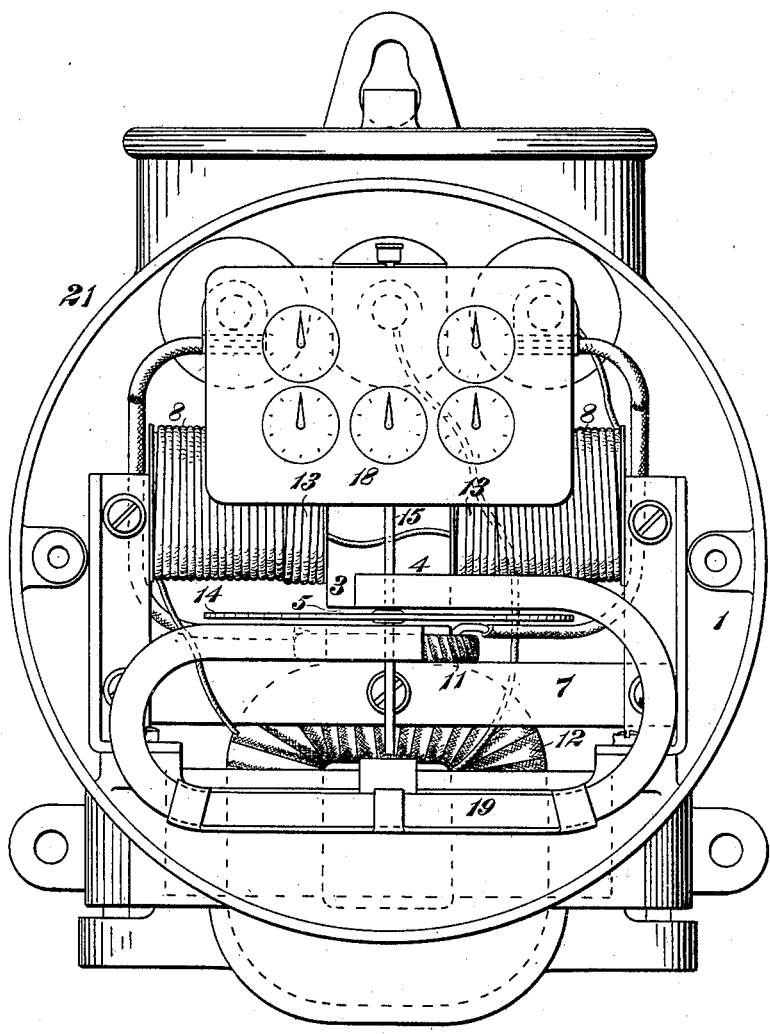

No. 608,842. Patented Aug. 9, 1898.
H. P. DAVIS & F. CONRAD.
ELECTRIC METER AND MOTOR.
(Application filed June 18, 1898.)
(No Model.) 5 Sheets—Sheet 1.

WITNESSES:

INVENTORS
Harry P. Davis
& Frank Conrad
BY
Wesley G. Carr
ATTORNEY.

No. 608,842. Patented Aug. 9, 1898.
H. P. DAVIS & F. CONRAD.
ELECTRIC METER AND MOTOR.
(Application filed June 18, 1898.)
(No Model.) 5 Sheets—Sheet 2.

WITNESSES:
INVENTORS
Harry P. Davis
& Frank Conrad
BY
ATTORNEY.

No. 608,842. Patented Aug. 9, 1898.
H. P. DAVIS & F. CONRAD.
ELECTRIC METER AND MOTOR.
(Application filed June 18, 1898.)

(No Model.) 5 Sheets—Sheet 3.

WITNESSES:
Ethan T. Dodds
H. C. Tener

INVENTORS
Harry P. Davis
& Frank Conrad
BY
Wesley G. Carr
ATTORNEY.

No. 608,842. Patented Aug. 9, 1898.
H. P. DAVIS & F. CONRAD.
ELECTRIC METER AND MOTOR.
(Application filed June 18, 1898.)
(No Model.) 5 Sheets—Sheet 4.

WITNESSES:
Ethan T. Dodds
H. C. Tener

INVENTORS
Harry P. Davis
& Frank Conrad
BY
Wesley G. Carr
ATTORNEY.

No. 608,842. H. P. DAVIS & F. CONRAD. Patented Aug. 9, 1898.
ELECTRIC METER AND MOTOR.
(Application filed June 18, 1898.)

(No Model.)  5 Sheets—Sheet 5.

WITNESSES:
Ethan P. Dodds
H. C. Tener

INVENTORS
Harry P. Davis
& Frank Conrad
BY
Wesley G. Carr
ATTORNEY.

UNITED STATES PATENT OFFICE.

HARRY P. DAVIS, OF PITTSBURG, AND FRANK CONRAD, OF WILKINSBURG, PENNSYLVANIA, ASSIGNORS TO THE WESTINGHOUSE ELECTRIC AND MANUFACTURING COMPANY, OF PENNSYLVANIA.

ELECTRIC METER AND MOTOR.

SPECIFICATION forming part of Letters Patent No. 608,842, dated August 9, 1898.

Application filed June 18, 1898. Serial No. 683,839. (No model.)

*To all whom it may concern:*

Be it known that we, HARRY P. DAVIS, residing at Pittsburg, and FRANK CONRAD, residing at Wilkinsburg, in the county of Allegheny and State of Pennsylvania, citizens of the United States, have invented a new and useful Improvement in Electric Meters and Motors, (Case No. 783,) of which the following is a specification.

Our invention relates to means for transforming electrical energy into mechanical energy and to electrical measuring instruments which embody such means and utilize the same for actuating suitable indicating, registering, or recording devices.

One of the objects of our invention is to provide a simple and efficient means whereby a shifting magnetic field may be produced and employed for actuating an armature or secondary member having circuits closed upon themselves and located in such magnetic field at a speed which is proportional to the energy in the circuit with which it is connected.

A further object of our invention is to provide a wattmeter for alternating-current circuits which shall accurately indicate or register the true energy supplied to the translating devices of the circuit to which such instrument is connected within widely-separated limits.

With these ends in view we have devised a motor which is extremely simple, compact, and inexpensive in construction and which is capable of exerting a relatively large starting torque and of running smoothly and satisfactorily under the various conditions which are met in commercial services.

The motor which constitutes the principal feature of our invention is peculiarly adapted for use as a meter-motor by reason of its simplicity of structure, the extremely wide range of speed of which it is capable, and the accuracy with which its speed conforms to the true energy to be measured.

Figure 2:
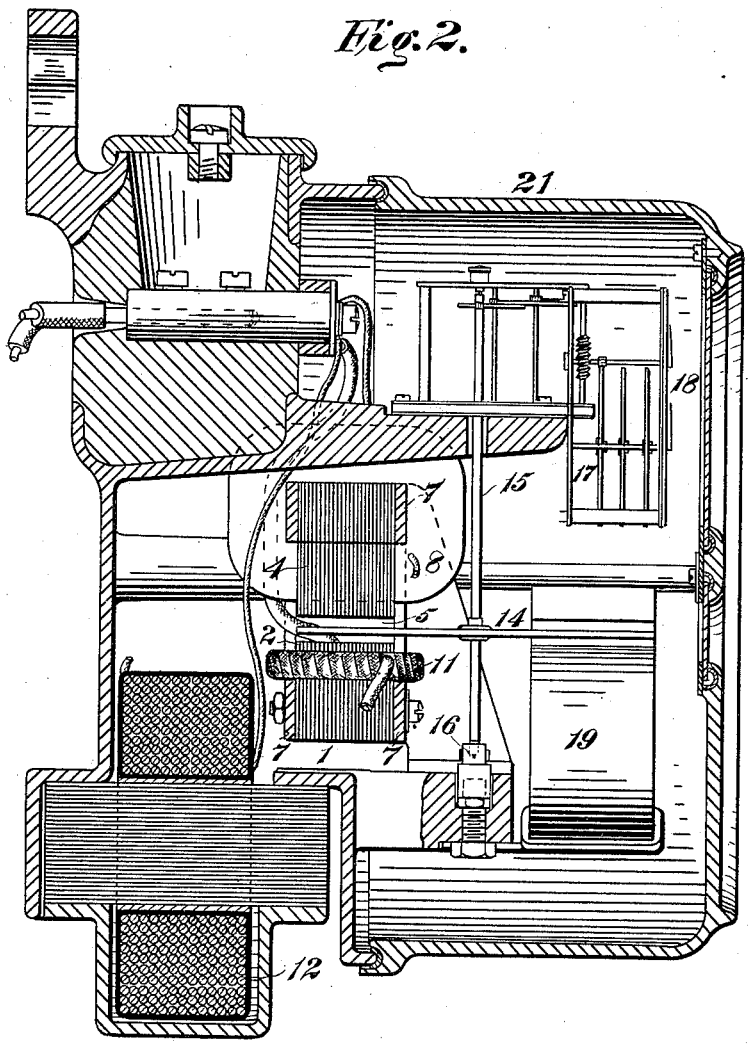
Figure 3:
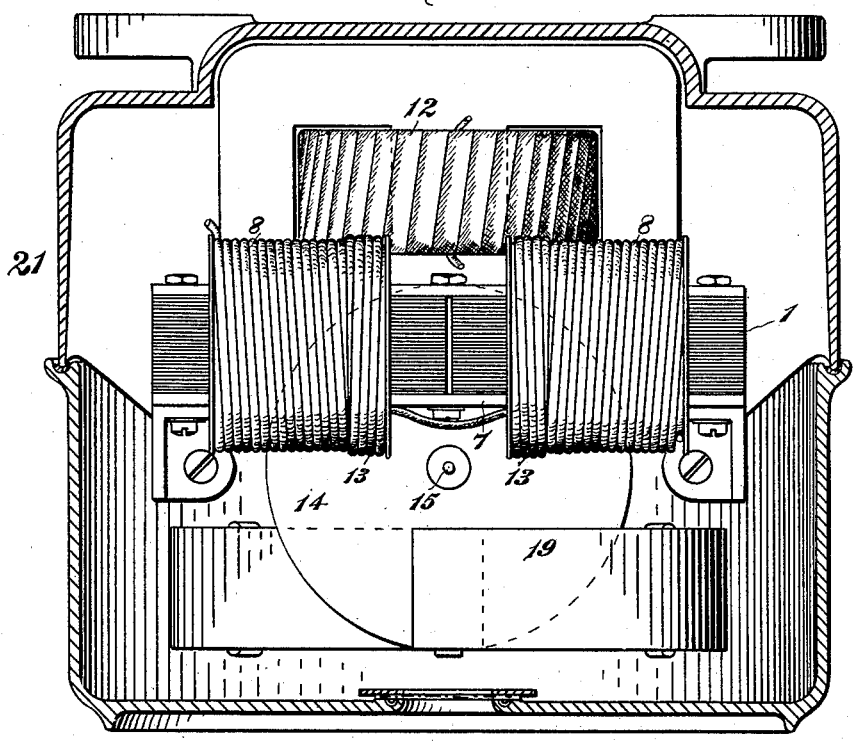
Figure 4:
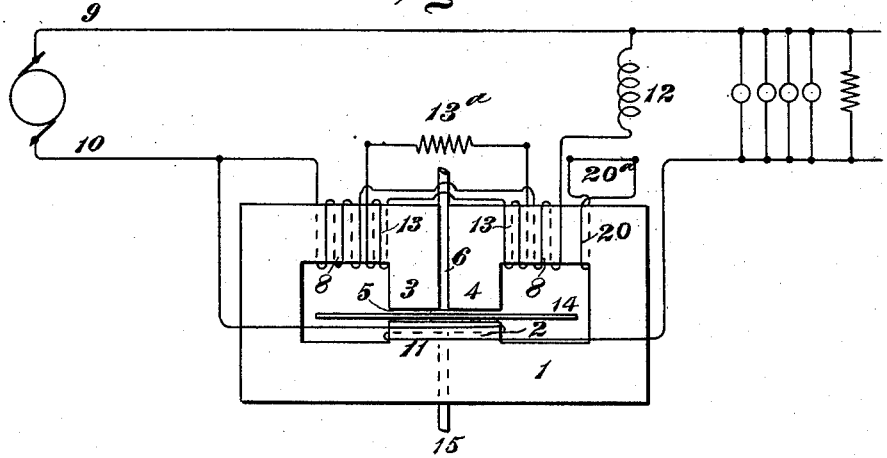
Figure 6:
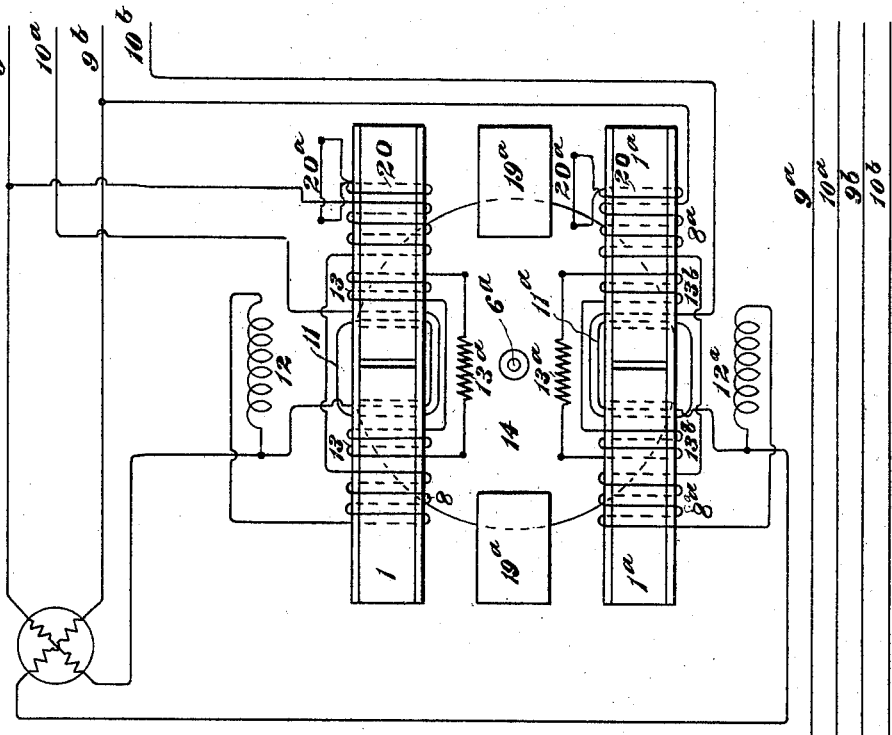
Figure 5:
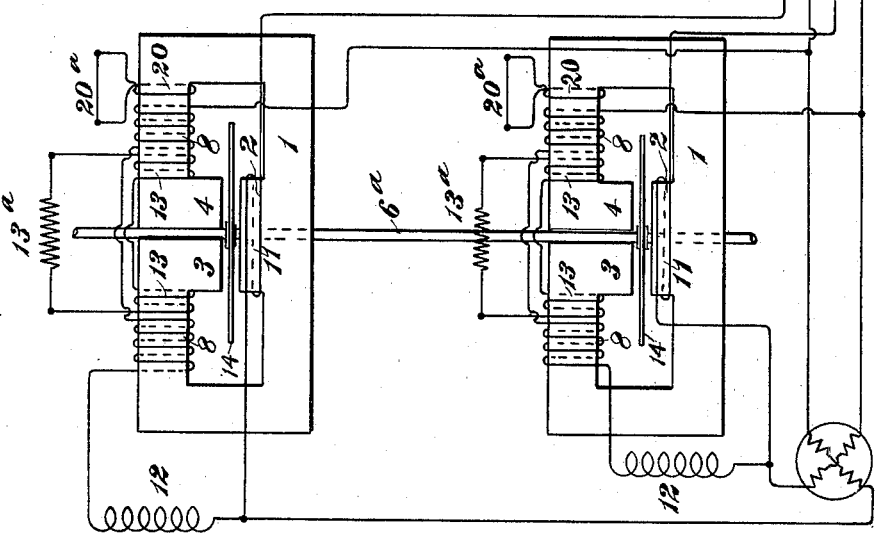
Figure 7:
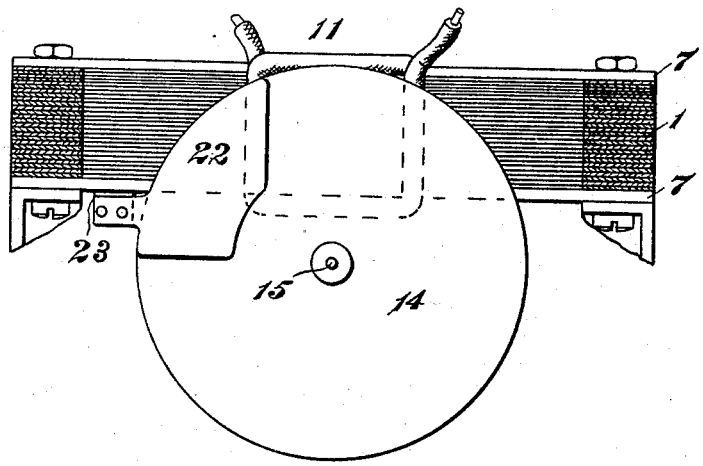
Figure 8:
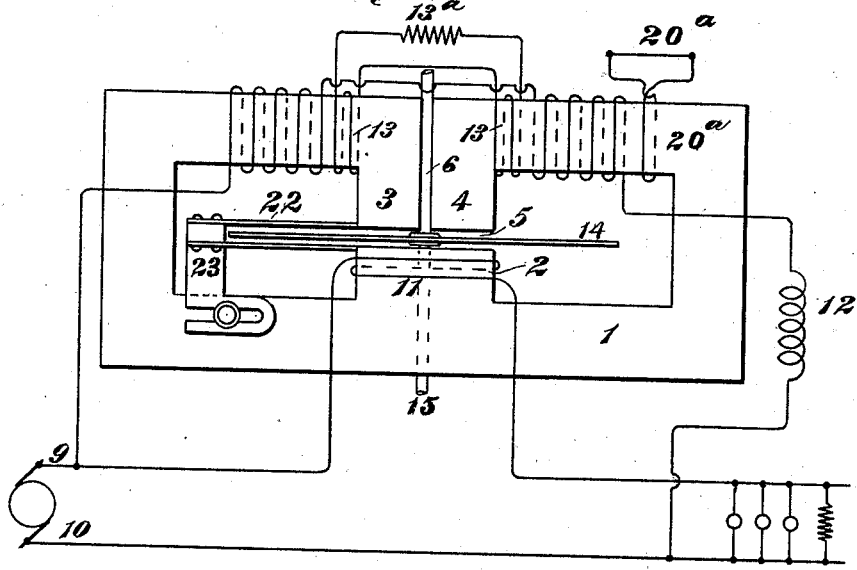

In the accompanying drawings, Figure 1 is a front elevation of a meter embodying our invention, the front plate of the inclosing case being removed. Fig. 2 is a vertical section taken at right angles to Fig. 1. Fig. 3 is a plan view of the main operating parts of the meter, the registering mechanism being removed and the case shown in section. Fig. 4 is a diagrammatic view of the motor part of the instrument and the circuit with which it is connected, and Figs. 5 and 6 are diagrammatic views of two forms of motor construction for two-phase wattmeters. Figs. 7 and 8 are respectively a sectional view and a diagrammatic front elevation of a meter-motor provided with an auxiliary actuating means.

Referring to Figs. 1 to 4 of the drawings, 1 is the core of the primary member of the motor, which is built up of iron plates, as is usual in the construction of cores for alternating-current apparatus. This core is provided at one side, preferably midway of its ends, with an inwardly-projecting pole-piece 2 and at the opposite side with two inwardly-projecting pole-pieces 3 and 4. The ends of the pole-pieces 3 and 4 are separated from the end of the opposite pole-piece 2 by an air-gap 5, and the pole-pieces 3 and 4 are also separated from each other by a gap 6. This gap 6 may be left as an air-space, if desired, but it is preferably filled with a solid plate of non-conducting material in order to give mechanical stability to the structure. The plates constituting the magnetizable portion of the core 1 are clamped rigidly together by means of relatively thick face-plates 7 and bolts which pass through such face-plates and the body of the core. Two coils 8, having a large number of turns of relatively small wire, surround the core and are preferably located adjacent to the pole-pieces 3 and 4. These coils are wound so as to magnetize the core, considered as a whole, in one direction at a given instant, and may therefore be considered in effect as a single coil. Since these coils are wound to produce a magnetic flux in the same general direction at any given instant, it obviously follows that the two poles adjacent to the gap 6 are of opposite sign. These coils 8 are connected across an alternating-current circuit 9 10 the energy of which it is desired to measure. The pole-piece 2 is designed to be magnetized by currents proportional to the current delivered to the work-circuit. In the drawings I have shown it as surrounded by a coil 11, having only a few turns of relatively large wire, this coil being connected directly in series with the circuit 9 10, and therefore serving to make of the pole-piece 2 an intermediate pole.

When the meter is intended to be used for measuring the energy of circuits carrying inductive loads, it is desirable that there shall be substantially a quadrature relation between the magnetic flux due to the current traversing the series coil 11 and that due to the current traversing the shunt-coils 8 for a condition of no inductive load upon the external or work circuit, or, in other words, that there shall be such a phase relation between the two fields of the motor that there will be no resultant torque exerted when there is a current lag of ninety degrees in the external or work circuit. This condition may be approximately secured by employing a properly-proportioned inductance-coil 12, which is included in circuit with the shunt-coils 8. This inductance-coil, if properly designed and proportioned, will afford nearly the ninety degrees relation desired; but in order to get exactly ninety degrees between the shunt and series fluxes or fields we may surround each limb of the core 1 with one or more turns of wire 13, either closed upon themselves independently or joined by a resistance-wire 13$^a$, so as to form a single closed circuit, as is indicated in Fig. 6. In the latter case the length of the resistance-wire 13$^a$ may be readily adjusted or varied, as may be found necessary, and such adjustment will affect both limbs of the magnet equally. The particular form of the closed conductors 13 is not material; but the magnetic circuits of the same should be coincident with the magnetic circuit of the shunt-coils 8 in order to secure the desired effect.

If the meter is intended solely for use in connection with non-inductive circuits—such, for example, as incandescent-lamp circuits—the inductance-coil 12 and the closed coils 13 may be omitted, since the self-induction of the shunt-coils will produce a sufficient difference in phase between the shunt-current and the series current to effect a rotation of the disk at a speed proportional to the energy of the work-circuit, the self-induction of the series coil so connected being small.

14 is the secondary member of the motor, which in the form of motor now being considered consists of a circular metal disk. This disk is rigidly mounted upon a suitable shaft or spindle 15, the lower end of which rests upon a jewel (not shown) which is set in a support 16, as is usual in such instruments. The upper end of the spindle 15 is geared to a suitable counting or registering train 17, such counting or registering train being in turn connected to the usual indicating devices on the face of the dial 18.

The spindle 15 is located midway of the length of the core 1 and at one side, so that the disk will project into the air-gap 5 between the face of the pole-piece 2 and the adjacent opposing faces of the pole-pieces 3 and 4, as is clearly indicated in Figs. 2, 3, and 5.

In order to secure a speed of rotation for the disk 14 that shall be proportional to the energy of the external or work circuit, we employ as a retarding or dampening device a permanent magnet 19, having oppositely-projecting overlapping ends between which the edge of disk 14 projects, this magnet and the core 1 being located at opposite sides of the spindle 15. A magnet of this form is more easily formed from a straight bar than any that has heretofore been employed, so far as we are aware. It may also be symmetrically located with reference to the other parts of the instrument and so as to occupy a minimum amount of space. While we regard this as a very desirable form of magnet, neither the meter nor the motor, taken as a whole, is limited to this specific means for retarding the speed of rotation of the armature.

We also provide in some or all cases, as may be found necessary or desirable, a friction-compensating coil of comparatively high resistance. This may be a coil of fine wire, formed of German silver or other high-resistance material, located upon or adjacent to one of the coils 8, or it may be a turn of copper wire 20, the ends of which are connected by a German-silver wire 20$^a$, as is indicated in Fig. 6. The last-named construction obviously permits of an adjustment of the resistance of the coil by varying the length of the wire 20$^a$. It will of course be understood that the size and composition of the wire and the number of turns comprised in the coil may be varied to suit the instrument to which it is applied and the electromotive force of the circuit with which the instrument is employed. It is well known that the employment of jewel-bearings reduces frictional resistance to an almost negligible quantity; but where an instrument is designed and adapted to run under the impulse of a very small amount of energy, as is the case with instruments constructed in accordance with our present invention, frictional resistance may be still further eliminated advantageously. It is regarded as desirable to so graduate the friction-compensating coil that its effect upon the disk will fall a little short of starting the same when the maximum voltage is applied to the shunt-coils only.

All of the apparatus thus far described is mounted in a metal box or case 21, provided with suitable apertures, which are covered by glass or other suitable transparent material in order that the indications may be read and the operation of the disk or armature observed whenever desired. It will be observed that the several parts are symmetrical and compact in structure and arrangement and that the casing serves to protect the operative parts from atmospheric effects, dust, &c., and also from injury or disarrangement from any other cause.

The operation of the meter which is embodied in the instrument just described is dependent upon a difference in phase between the magnetic flux or fluxes due to the current in the shunt-coils and the flux or fluxes due to the current in the series coil. In instruments designed for use upon circuits in which some inductive load may be included the construction is preferably such as to give a ninety-degree difference of phase under conditions of no inductive load. In circuits which have substantially no inductive load, however, such as those supplying incandescent lamps, the phase difference between the two fluxes may be less than ninety degrees and the instrument calibrated to give a correct registration of the energy delivered to the translating devices. We will assume, however, for the purpose of describing the operation of the instrument, that the phase difference between the shunt and series currents and between the corresponding magnetic fluxes is ninety degrees for a condition of no lag in the external or work circuit. When the series current is at zero and the shunt-current is at its maximum positive value, there will be a strong magnetic flux across the gap 6, by reason of the large number of turns in and the location of the shunt-coils. A portion of the shunt-flux will also traverse the armature. From the zero-point of the series current to that where the shunt and series currents are both positive and equal the gradually-increasing magnetic flux across the air-gap 5 due to the series current will be reinforced in one half of the core 1 and opposed in the other half by the shunt-flux. This will result in producing an effective resultant flux which is mainly at one side of the air-gap 5—for example, between the pole-piece 3 and the corresponding side or edge of the pole-piece 2. As the series current increases and the shunt-current decreases from this point the effective resultant flux across the air-gap 5 will gradually spread out until the series current reaches a maximum and the shunt-current becomes zero, when the resultant flux will be symmetrical as regards the poles 2, 3, and 4 and the air-gap 5. As the shunt-current approaches a negative maximum and the series current decreases from its maximum positive value the effective resultant flux will be shifted more and more to the other side of the air-gap 5 until the shunt and series currents attain the same value. This resultant flux will be maintained at the same side of the air-gap, but will decrease in volume until the series-current reaches zero and the shunt-current attains its maximum negative value. The operation during the remaining portion of the period or cycle will be the same as that described, except that at each corresponding instant of time the resultant flux will be in the reverse direction. Each succeeding cycle or period is obviously the same as that which preceded it, and the shifting magnetic field thus produced serves to rotate the disk at a speed dependent upon the cosine of the angle of lag in the work-circuit, assuming that the current and impressed electromotive force are constant. This alternate shifting of the effective resultant flux from one side to the other of the air-gap 5 by reason of the alternate reinforcement and opposition of the fluxes at these two sides will obviously be at a maximum when there is a phase difference of ninety degrees between the shunt and series current, and this resultant shifting field will decrease in strength and duration as the phase angle between the two currents decreases until the two currents are in step, when the effective resultant field will be mainly or wholly located at one side of the air-gap 5. Under this condition the resultant flux will be alternately reversed in direction, but will not shift to the other side of the air-gap, and hence there will be no rotation of the disk.

Since the shunt-coils have two magnetic circuits, it is desirable that a relatively large number of turns should be employed. On the other hand the shunt-field that acts directly upon the armature should be comparatively weak. These requirements are met by so constructing the core and so locating the shunt and series coils thereon that substantially all of the series field and only a proper portion of the shunt-field shall act directly upon the armature while the entire shunt-field operates to preserve constant the counter electromotive force of the shunt-circuit.

The form of the core and the location of the coils thereon may of course be varied from what is shown without departing from the invention, provided the structure and location of parts are such that the proper relation between the shunt and series fields, hereinbefore specified, is maintained.

Having described our invention in connection with single-phase circuits, we will now set forth its adaptability for use in connection with polyphase circuits, reference being had to Figs. 5 and 6 of the drawings.

In the form shown in Fig. 5 we employ two motors in all respects like those hereinbefore described. The coils 8 and 11 of one motor are connected, respectively, across and in series with circuit $9^a$ $10^a$, and the corresponding coils of the other motor are connected, respectively, across and in series with circuit $9^b$ $10^b$, the current in which normally differs in phase from that in circuit $9^a$ $10^a$. The motors are arranged in vertical alinement with each other, and the two armatures 14 are mounted upon a single shaft $6^a$, which is geared to a single counting-train. (Not shown.) It will be readily seen that the energy in each circuit will exert its own torque upon the shaft $6^a$ independently of that in the other circuit and that the total energy of the two circuits will be registered irrespective of the phase relation between the currents in the two circuits.

In the form shown in Fig. 6 a core 1ª, shunt-coils 8ª, a series coil 11ª, closed coils 13ᵇ and 20ᵇ, and an inductance-coil 12ª, in all respects like the corresponding parts 1, 8, 11, 12, 13, and 20 hereinbefore described, are located at the opposite edge of the disk 14. The coils 8 and 11 are connected with a circuit 9ª 10ª and the coils 8ª and 11ª with the circuit 9ᵇ 10ᵇ, the current in which is normally in quadrature with that in circuit 9ª 10ª. In this form of instrument two permanent magnets 19ª are located at opposite edges of the disk between the actuating-magnets in lieu of the single magnet 19 shown in the other figures of the drawings. With this combination and arrangement of apparatus each shifting field produced will exert a torque upon the single disk that is proportional to the energy in the external or work circuit with which its producing coils are connected, and consequently the instrument will register the total energy in the two out-of-phase circuits.

We will now consider the conditions under which an auxiliary actuating device, such as is illustrated in Figs. 7 and 8, may be advantageously employed. When the series field is too strong relatively to the total shunt-field, the phase relations of the two will be disturbed and an apparent damping effect produced. This condition may obtain, for example, when the instrument is employed for measuring the energy in constant-potential circuits, the retarding effect varying with changes in the quantity of current, as will be readily understood. In cases where the conditions are such as to sensibly affect the desired proportional speed of the armature we propose to employ the auxiliary actuating device shown in Figs. 7 and 8. This device, as shown, consists of two magnetic plates or shields 22, located, respectively, above and below the armature 14 and adjacent to one side of the pole-piece 2. Some of the lines of force will obviously be diverted from their normal path by means of these plates. This distortion of the series field will vary in amount as the current through the series coil varies, and consequently the uniformity of action of the instrument which is desired will be secured. The plates 22 may be conveniently supported by means of a bracket 23, which has a slot-and-screw connection with the core, so that it may be adjusted with reference to the disk 14, if desired. This auxiliary actuating device may be modified in form from what is shown, and it may be utilized only in connection with loads which are greater than those for which the instrument is designed, it being dispensed with when the meter is used in connection with light or medium loads, such as do not extend beyond the range within which the instrument is designed to normally operate.

It will be understood that any known means may be employed for increasing the phase difference between the magnetic fluxes in the motor and that the resulting motion may be imparted to means for indicating or to means for recording the same or be otherwise utilized.

We claim as our invention—

1. In an induction alternating-current motor, a primary member comprising a divided core, a coil or coils having a large number of turns and wound to produce magnetic fluxes of opposite sign in the poles formed by the division of the core, a coil or coils having a small number of turns and wound to produce magnetic fluxes of the same sign in said poles and means for supplying currents to said coils or sets of coils which differ in phase, in combination with a secondary member in position to be traversed by the resultant magnetic flux or fluxes.

2. In a wattmeter for alternating-current electric circuits, the combination with a laminated core having a transverse air-gap, of a shunt-connected coil or coils for producing magnetic fluxes of opposite sign in the poles adjacent to said air-gap, a series-connected coil or coils for producing a magnetic flux or fluxes of the same sign in said poles, a movable closed-circuit conductor adjacent to said poles, means for retarding and means for registering or indicating its movement.

3. A meter for measuring the energy in alternating-current electric circuits comprising a core containing an air-gap forming adjacent poles and having an intermediate pole, shunt-connected coils for oppositely magnetizing said adjacent poles, a series-connected coil or coils for magnetizing the intermediate pole, a movable closed conductor projecting between the pair of poles and the intermediate pole, means for retarding and means for registering or indicating the movement of said conductor and means for lagging the current traversing said shunt-connected coils.

4. A meter for measuring the true energy in alternating-current circuits comprising a core having a pair of separated polar projections and a polar projection opposite the same, shunt-connected coils for oppositely magnetizing said pair of projections, a series-connected coil or coils for imparting magnetism of the same sign to said pair of poles, means for securing a quadrature relation between the current in said shunt-connected coil or coils and the impressed electromotive force, a rotatable secondary member actuated by the shifting magnetic field thus produced, means for retarding and means for registering or indicating the movement of the same.

5. A meter for measuring the energy in alternating-current circuits comprising a core having separated poles, a shunt-connected coil or coils having a large number of turns for oppositely magnetizing said poles, a series-connected coil or coils having a small number of turns for alternately reinforcing and opposing the magnetism of said poles, a movable, closed conductor in inductive relation to the resultant flux produced by the currents in said coils, means for retarding and means for registering or indicating the movement of said conductor and means for lagging the current traversing said shunt-connected coils.

6. An electrical measuring instrument comprising a laminated core having an inwardly-projecting pole-piece 2 at one side and a pair of inwardly-projecting pole-pieces 3 and 4 at the opposite side the faces of which are substantially parallel and opposite to the face of pole-piece 2, a series-connected coil on pole-piece 2, shunt-connected coils surrounding the core and respectively adjacent to pole-pieces 3 and 4, a closed-circuit armature projecting between the opposing pole-faces and a damping-magnet between the poles of which said armature projects, all combined and operating substantially as described.

7. In an alternating-current wattmeter, a disk-armature, and a laminated core having a pole-piece located adjacent to one face of said armature, and having a pair of pole-pieces located adjacent to the opposite face of the armature, in combination with a series coil of comparatively few turns at one side of the armature and a pair of shunt-coils having a large number of turns at the other side of the armature so wound as to oppositely magnetize the pole-pieces at that side whereby the necessary resultant flux is secured and the desired relation between the shunt-current and the impressed electromotive force is maintained.

8. In an alternating-current electric motor, the combination with a plurality of coils or sets of coils traversed by out-of-phase currents, of an inductively-actuated armature located between said coils or sets of coils, and a core for said coils or sets of coils having a gap disposed across the normal path for the magnetic flux of one phase and in but not across the normal path for the magnetic flux of the other phase whereby a small portion of the first-named flux is caused to act directly upon the armature, and whereby the other flux is caused to act as a whole directly upon the armature and also to thread the coils corresponding to the other flux.

9. In a wattmeter for alternating-current circuits, a laminated core having two air-gaps substantially at right angles to each other, in combination with a closed-circuit armature located partially in one of said air-gaps, shunt-coils constructed and arranged to produce a strong magnetic flux across the other air-gap and a relatively weak flux through the armature, and a series coil arranged to produce a magnetic flux through the armature and through one or both of the shunt-coils whereby a shifting field is produced and the desired relation between the shunt-current and the impressed electromotive force is maintained.

10. An alternating-current motor having a rotatable closed-circuit secondary member and a primary member comprising a shunt-winding at one side of the secondary member, a series winding at the other side, and a core for said windings, said core and windings being so constructed and arranged that only a portion of the shunt-flux passes through the secondary member and the entire series flux passes through said member and threads all or a part of the shunt-winding.

11. The combination, in an electric meter, of a main actuating means for propelling the meter-armature, and an auxiliary actuating means exercising an independent propelling force that varies as the work-current varies, substantially as described.

12. The combination, in an electric meter, of a main actuating means having an approximately constant law of operation, a retarding device having a suitable law of operation to correspond to the actuating means and an auxiliary actuating means exercising a propelling force that varies as the work-current varies, as set forth.

13. In an electric meter, the combination with a primary member having shunt and series connected coils for producing a resultant shifting magnetic field, of a rotatable secondary member located partially in said field and means for distorting a series field so as to impart a propelling force to the secondary member that varies as the work-current varies.

14. In an electric meter, the combination with a primary member having shunt and series connected coils for producing a resultant shifting magnetic field, of a rotatable secondary member located partially in said field and an auxiliary actuating device consisting of a segmental magnetic shield or shields located adjacent to said secondary member in such position as to distort the series field and thus impart a propelling force to the rotatable member that varies as the work-current varies.

In testimony whereof we have hereunto subscribed our names this 16th day of June, 1898.

HARRY P. DAVIS.
      FRANK CONRAD.

Witnesses:
 WESLEY G. CARR,
 H. C. TENER.